Patented Oct. 30, 1945

2,387,730

UNITED STATES PATENT OFFICE 2,387,730

PROCESS FOR OBTAINING CORK-LIKE PRODUCTS FROM POLYMERS OF ETHYLENE

Witty L. Alderson, Jr., Wilmington, Del., assignor to E. I. du Pont de Nemours & Company, Wilmington, Del., a corporation of Delaware No Drawing. Application April 7, 1942, Serial No. 438,039

1 Claim. (Cl. 260—94)

This invention relates to porous materials, more particularly to cork-like products, and to methods for producing such products.

In the preparation of cellular products, such as sponge rubber, it has long been the general practice to incorporate in the material to be "blown" a solid blowing agent which, under the influence of heat, evolves gas thus causing the formation of numerous cells which impart porosity and low density to the finished product. This procedure gives fairly good results with rubber and similar materials which can be milled at low temperatures but the porous products thus obtained are often contaminated and do not have small uniform and discrete pores, and consequently they are readily impermeated by liquids and gases, and have poor insulating properties. Another method frequently employed in preparing spongy polymeric materials consists in dispersing an inert insoluble gas in the molten polymer and then extruding through a screen in order to comminute the entrapped bubbles. This procedure gives products having large and non-uniform pores and consequently these materials do not have either the resilience or body of cork. It is further handicapped by the necessity of cooling the extruded sponge very rapidly in order to prevent it from collapsing. It has also been suggested to heat resins in the presence of a soluble gas and then submit the molten mass to quick expansion. This method, however, gives brittle products which do not have the small, uniform and discrete cells which are required for imparting cork-like properties.

This invention has as an object a new and improved method for preparing cellular, cork-like, products characterized by low density, very small and uniform pores, great chemical inertness and absence of taste and odor. Other objects will appear hereinafter.

The above objects are accomplished by heating a normally solid ethylene polymer of the kind described below above its melting point under pressure of a gas that is soluble in the molten polymer, partially reducing the applied pressure without substantially lowering the temperature, and then cooling the expanded polymer under maintained superatmospheric pressure.

In the practice of this invention any normally solid polymer obtained either by polymerizing ethylene alone or in admixture with another polymerizable organic compound, by halogenating a preformed ethylene polymer, by dehalogenating halogenated preformed ethylene polymers, or by sulfonating preformed ethylene polymers can be used. The above products can be obtained by the methods described in U. S. Patents 2,153,553, 2,188,465, 2,200,429, 2,183,556, 2,212,786, and 2,261,757. The polymers of ethylene alone and the polymers of ethylene with other polymerizable organic compounds can also be obtained by contacting ethylene alone or in admixture with another polymerizable organic compound with water and a per-compound catalyst at temperatures in the range of 20° to 350° C. and superatmospheric pressures in excess of atmospheric and preferably in excess of 3 atmospheres. The polymers obtained from ethylene alone melt or soften between about 100° C. and about 200° C., depending on their molecular weight, which is preferably in excess of 4000. They correspond in composition substantially to $(CH_2)_x$ and show a crystalline structure when subjected to X-ray diffraction analysis. The properties of the polymers of ethylene with other polymerizable organic compounds vary depending upon the composition of the polymer and the nature of the polymerizable organic compound, and those of the halogenated polymers upon their halogen content. The properties of the dehalogenated polymers depend not only upon those of the starting material but also upon the extent of the dehalogenation effected and upon whether or not the dehalogenation is accompanied by introduction of other groups into the polymer. The sulfonated polymers are normally solid and are at least partially soluble in alkali.

In the new process described herein, wherein the spongy polymer is made by placing the molten polymer under pressure of a gas soluble therein, followed by partial reduction in pressure while maintaining the temperature, and then cooling the polymer under pressure, the initial pressure can be from about 100 to several thousand pounds per square inch or higher. The maximum pressure depends on the solubility characteristics of the gas used and on the mechanical strength of the vessel employed. The temperature of the polymer at this stage is that of the melting point or higher but below the decomposition point. In the stage wherein the pressure is partially reduced, the pressure drop should correspond at least to about 25% of the initial pressure and the temperature should be maintained above or at the melting point of the polymer and within 200° C. of that mentioned above. The residual pressure is a function of the initial pressure and pressure drop and will vary from very high residual pressures of about 1000 pounds per square inch to those in the neighborhood of 20 pounds per square inch. In the last stage wherein the molten polymer is cooled to solidification under residual pressure as defined above, the final temperature should not be greater than the softening point of the polymer and is preferably between 15° C. and 50° C.

In the best method of practicing the invention the molten polymer is heated to a temperature of from 120° C. to 140° C. under an ethylene pressure of from 500 to 1000 pounds, or other gas soluble in the molten polymer, the pressure allowed to drop from 50 to 80% of the initial pressure without substantial change in temperature, and the polymer cooled to solidification under a pressure of 50 to 200 pounds per square inch. An example of a preferred embodiment of the invention consists in heating the powdered ethylene polymer for 2.5 hours in a closed container under 500 pounds per square inch ethylene pressure at 130° C. then, while still hot, reducing the pressure by 300 pounds and cooling the expanded polymer under a residual pressure of 100 to 200 pounds per square inch.

The following examples illustrate in more detail the method of practicing the invention.

Example I

Five parts of a powdered ethylene polymer having an average molecular weight of about 25,000 and a density of 0.94 is heated for 2.5 hours in a closed vessel under 545 pounds per square inch of ethylene pressure at 130° C. While maintaining the temperature substantially constant ethylene is bled off until the pressure inside the container drops to 245 pounds per square inch. This operation usually requires about 0.2 to 5 minutes. After cooling to room temperature the pressure inside the vessel is about 150 pounds per square inch. At this point the ethylene polymer has acquired all the physical properties exhibited by the final product. This residual pressure is now released and the expanded polymer is removed from the container.

The product obtained by this procedure has a density of 0.33 as compared to 0.25 for cork and 0.94 for unmodified ethylene polymer. It contains numerous small discrete uniform cells measuring about .005" in diameter. This material is resilient, impermeable to water, tasteless and odorless. It is advantageously used as a cushion liner for beverage bottle caps.

It is essential in the practice of this invention that the pressure gas be soluble in the molten polymer. Thus, under similar conditions using a gas such as nitrogen which is substantially insoluble in molten ethylene polymer a product is obtained which has a density of 0.6, by contrast, is practically non-resilient and contains fewer and larger pores than the product obtained using ethylene as the pore-forming gas. This type of high density material is also obtained, if, after the molten polymer has been heated with ethylene under pressure, it is extruded directly into cold water at atmospheric pressure. Products obtained by this last procedure have large interconnecting pores and do not in any way approach cork in their physical properties.

Example II

An ethylene polymer conforming in properties with that of Example I is heated at 130° C. in a closed vessel for 2.5 hours under 500 pounds per square inch ethylene pressure. The pressure is then reduced 400 pounds by bleeding off ethylene, without substantially lowering the temperature. The vessel is cooled to room temperature under a residual pressure of 75 to 100 pounds per square inch, after which the remaining gas is allowed to escape. The product thus obtained has a density of 0.17. It is soft and resilient and is made up of small uniform cells measuring approximately 0.01" in diameter.

If the ethylene pressure is reduced very rapidly to atmospheric pressure, while maintaining the temperature at 130° C., a product is obtained which has a density of 0.29 but which is composed of large non-uniform, interconnecting pores measuring from 0.12 to 0.25" in diameter. These large communicating cells detract from the insulating properties of this material and at the same time greatly reduce its resiliency and form stability. If, however, the gas is bled off over a period of about 0.2–5 minutes until the pressure inside the bomb is equal to the atmospheric pressure and the ethylene polymer is then cooled a non-resilient product having a density 0.78 is obtained which contains few pores and has inferior insulating properties and which in no way resembles cork.

Products exhibiting a wide range of density and pore size can be obtained by carefully controlling the temperature, pressure drop and residual pressure. In general a density of about 0.25 and a pore size of approximately 0.001" is most desirable for products intended as cork substitutes. However, for spongy absorbent material densities around 0.1 and a pore size of about 0.01" are very satisfactory. The degree of porosity and consequently the density, resilience and insulating properties of the product prepared by the process of this invention depend primarily on a combination of the following factors: Initial pressure of the soluble gas, the decrease in this pressure (pressure drop) before cooling the expanded polymer, and the residual pressure under which the "blown" polymer is cooled. Each specific combination of these variables corresponds to a given set of physical properties. In the preparation of products possessing cork-like properties it is preferred to bring about the desired pressure drop inside of at least about 0.2 minute.

Compounds other than ethylene that can be used as the soluble gas include methane, propane, butane, propylene, methyl chloride, methyl bromide, vinyl chloride, methylene chloride and the like. In short any compound which is at least partially soluble in the molten ethylene polymers under superatmospheric pressure conditions and which boils below about 90° C. is operable. Any mixture of 2 or more such compounds alone or in admixture with an insoluble gas such as nitrogen or carbon dioxide can also be used, but it is generally preferable to operate with low boiling, saturated or unsaturated aliphatic hydrocarbons as these are relatively more inert chemically and do not contaminate the final product.

Useful spongy products can be made by the practice of this invention from polymers obtained by polymerizing ethylene alone or with various polymerizable compounds, but the polymers of ethylene alone are preferred because they produce tough, and chemically inert products. Examples of suitable polymerizable organic compounds which can be polymerized with ethylene are vinyl acetate, styrene, methyl methacrylate, tetrafluoroethylene, stilbene, limonene, maleic acid and its esters, fumaric acid and its esters, itaconic acid and its esters, isobutylene, propylene, carbon monoxide, trichloroethylene, acrylonitrile, etc.

Other examples of modified ethylene polymers are those obtained by halogenating preformed ethylene polymers according to U. S. Patent 2,183,556; the sulfonated polymers produced according to U. S. Patent 2,212,786; and the dehalogenated polymers produced according to U. S. Patent 2,261,757.

The expression "ethylene polymers" is used herein to refer not only to the polymers from ethylene alone but also to modified ethylene polymers of the above kind. The halogenated ethylene polymers are particularly useful in giving fireproof products. The ethylene polymers may also be modified by blending with polymeric materials, e. g., poly(2-chlorobutadiene-1,3), polyisoprene, and certain ethylene/vinyl acetate polymers. To these blends can be added cross-linking reagents, e. g., sulfur, etc., and the temperature raised, after the mixture has been "blown," to bring about cross-linking. In this way vulcanized products exhibiting improved resistance to solvents and reduced plasticity are obtained. Other modifying agents that can be used are animal, vegetable, and mineral fibers, pigments, e. g., diatomaceous earth and luminous pigments such as calcium sulfide, strontium sulfide, zinc sulfide, and the like, cork, leather, wood flour and abrasives such as emery and silica, etc. Powdered silica gel or activated alumina and finely divided metals such as nickel or iron which are capable of adsorbing the soluble gas used as the "blowing" agent can be used to act as active centers in pore formation during the "blowing" of the polymer, thus decreasing the size and increasing the number of pores in the final product and thereby improving its density and insulating properties.

The present invention provides an economical and practical method for making porous materials which are useful in the manufacture of a wide variety of improved porous or cork-like products. These products possess a highly uniform pore structure consisting of discrete cells and can be readily obtained either with minute cells and unusually low density or with larger cells depending on the use to which the product is to be put.

The cork-like physical properties of the porous materials described herein and their remarkable chemical inertness and resistance to aging render the products obtained by the process of this invention particularly useful for insulating the walls, floors, and ceilings of dwellings and other buildings, refrigerators, constant temperature rooms, hot water tanks, hot water pipes, containers for cold and hot foods and liquids, gloves, light weight tropical hats, and automobile and aeroplane bodies. They are also useful as closures in bottle caps, gaskets, bungs, packaging material, vibration and shock absorbers, sound insulation, life preservers, wadding material for shotgun shells, non-slip covering for floors, drawers, bobbins, golf clubs, etc., electrical insulation, polishing wheels, self lubricating bearings, feed rolls for typewriters, centers for baseballs, as a support for sand paper or emery cloth, innersoles, box toes, counters and bottom fillers for shoes, for tipping cigars and cigarettes, as a seating for valves, etc.

As many apparently widely different embodiments of this invention may be made without departing from the spirit and scope thereof, it is to be understood that I do not limit myself to the specific embodiments thereof except as defined in the appended claim.

I claim:

A process for preparing porous ethylene polymer which comprises heating the polymer at least to its melting point and between 100° to 200° C., in a closed vessel under a pressure of 545 pounds per square inch of a gas soluble in the molten polymer, partially reducing the pressure of said gas by at least 25% but to a pressure of at least 20 pounds per square inch on the molten polymer without substantial change in its temperature, the partial pressure reduction being effected by bleeding said gas from the vessel during a time interval of from 0.2 to 5 minutes, and then solidifying the polymer by cooling the molten polymer in the closed vessel under the pressure which obtains therein after the above mentioned partial reduction in pressure.

WITTY L. ALDERSON, Jr.